Nov. 3, 1964  P. L. KENNEY  3,155,148
PULLEY CASE AND CURTAIN ROD COMBINATION
Filed April 5, 1960
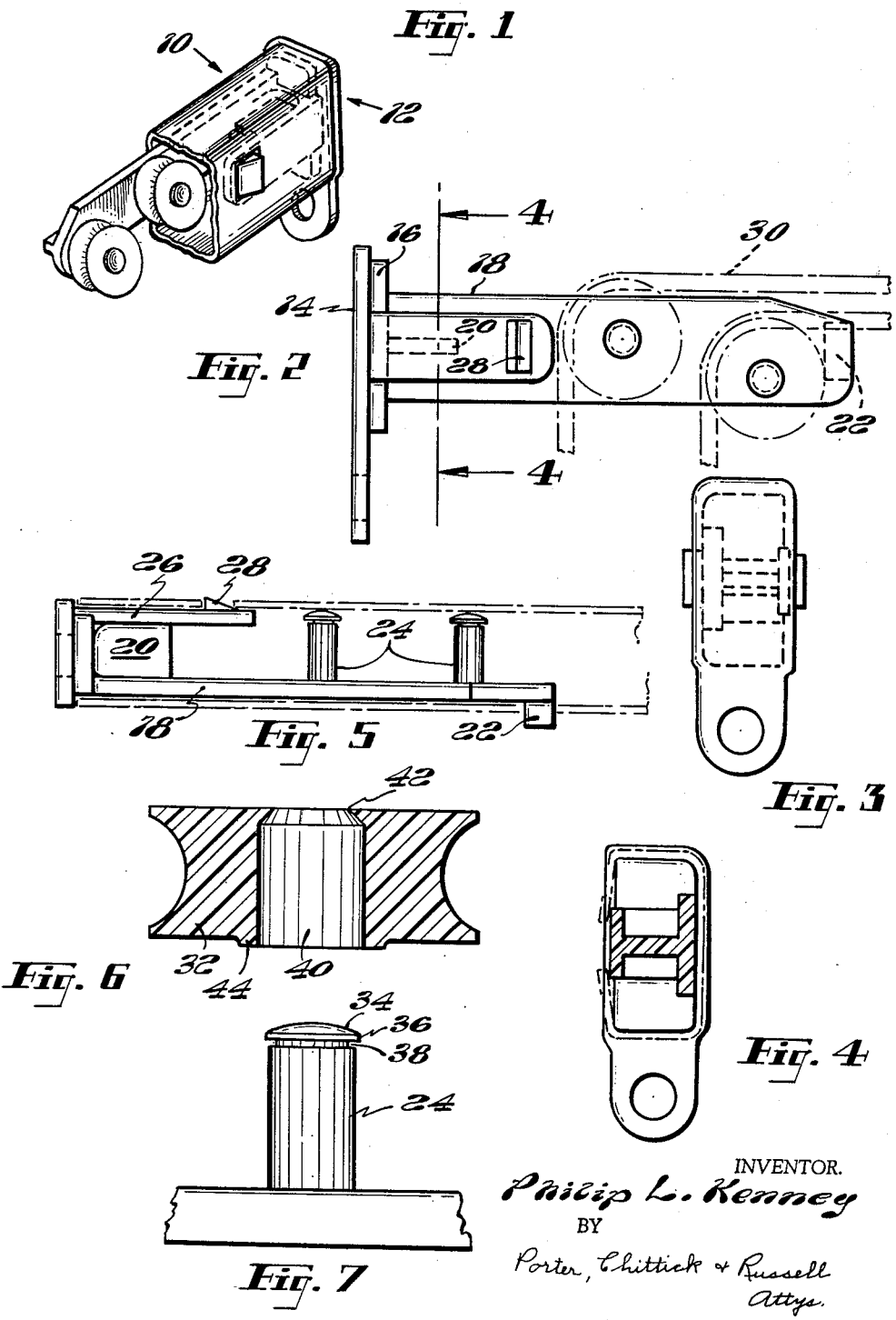
INVENTOR.
Philip L. Kenney
BY
Porter, Chittick & Russell
Attys.

United States Patent Office 3,155,148
Patented Nov. 3, 1964

3,155,148
PULLEY CASE AND CURTAIN ROD
COMBINATION
Philip L. Kenney, Cranston, R.I., assignor to Kenney Manufacturing Company, Cranston, R.I., a corporation of Rhode Island
Filed Apr. 5, 1960, Ser. No. 20,116
3 Claims. (Cl. 160—344)

This invention relates to pulley support mechanism, and more particularly to support mechanism for pulleys for hollow curtain rod drawcords.

In the past curtain rod drawcord pulleys have been, on the whole, functionally satisfactory, but several disadvantages have been present that the industry has long sought to overcome. A free, relatively noiseless operation can be achieved by the use of ball bearing pulleys or sheaves, but they are expensive. A noiseless operation can be achieved inexpensively by a fixed lug arrangement in which the cord support or lug does not rotate but merely guides the cord. However, with the fixed lug arrangement the cord pull is not as free as it might be. Other known types of pulley mountings are apt to be both noisy and expensive.

Accordingly it is an object of my invention to provide a simple, inexpensive, noiseless, and freely rotating pulley support for hollow curtain rods. Another object of my invention is to do this with a minimum of materials and parts so as to reduce the costs of both materials and labor.

In the accomplishment of these and other objects of my invention in a preferred embodiment thereof, I use a moldable plastic such as nylon and I make a pulley case dimensioned for insertion into the end of a hollow curtain rod. The pulley case itself comprises a base designed with an end flange to fit snugly into the curtain rod with the end flange flush up against the end of the rod. On the inside a pulley support arm extends from the base inwardly along one side wall of the rod. If a C-shaped cross section rod is used, the pulley support arm preferably lies along the open side of the C and overlaps it on the inside. The pulley support arm has a pair of pulley support pintles molded onto it and dimensioned to extend across the inside of the rod to a position close to the opposite side wall of the rod. A pair of pulleys are mounted on the pintles. The whole assembly fits snugly into the end of the rod and is locked in by a resilient latch mounted on a relatively short arm on the base.

It is a feature of my invention that the pintles serve a dual function of supporting the pulleys for free rotation and of providing the pulley support arm with lateral support within the rod. It will be understood that the manufacture of molded plastic articles, and particularly long and thin elements such as the pulley support arm employed in my invention, is relatively inaccurate. Such elements often warp slightly on cooling, and moreover, when subjected to stress, tend to bend or otherwise distort. In the arrangement of my invention the molded pintles on the pulley support arm buttress the pulley support arm against such distortion.

Other features of my invention include the facts that it is extremely simple, noiseless in operation, and easily assembled. The pulleys are also made of molded plastic, and adjacent to the outer end of their inner bearing surface they carry a small annular beveled lip. The pintles conversely have a small molded groove near the outer end thereof, and the lip inside the pulleys rides freely in this groove after the pulleys have been forced in place on the pintles. The pintle also has a slightly enlarged beveled rim at its very end. These elements serve to lock the pulley in place on the pintle and also to position the pulley slightly backwardly from the end of the pintle so that the pulley does not scrape on the inside of the rod as the pulley turns.

It is a feature of my invention that the dimensions selected for the overlap of the lip inside the pulley and the rim on the tip end of the pintle are well within the elastic limit of the plastic from which these elements are molded. In this way forcing the pulley onto the pintle causes the lip and rim to recede elastically without rupture and then return to its former position after insertion.

Further objects and features of my invention will best be understood and appreciated from the following detailed description of a preferred embodiment of my invention, selected for purposes of illustration, and shown in the accompanying drawings, in which:

FIG. 1 is a view in perspective of the curtain rod of my invention with the rod broken away to expose to view the pulley support elements within the case;

FIG. 2 is a view in side elevation of the pulley support elements showing the curtain drawcords in dotted lines;

FIG. 3 is a view in end elevation of the pulley support elements shown in FIG. 2;

FIG. 4 is a cross sectional view along the lines 4—4 of FIG. 2;

FIG. 5 is a plan view from above of the pulley support elements shown in FIG. 2;

FIG. 6 is an enlarged cross sectional view of an individual pulley employed in my invention; and FIG. 7 is an enlarged plan view of the molded pintle employed in supporting the pulley of FIG. 6 for free rotation.

The preferred embodiment of my invention herein shown comprises a hollow curtain rod indicated at 10 in FIG. 1. The rod shown herein is a conventional curtain rod having an opening extending across one side thereof so that the cross section roughly resembles a C. It will be understood that the rod may equally be of different shapes, such as inverted U-shape, round, oval, etc. without departing from the spirit of the invention herein described.

In order to support drawcords running within the rod, I employ a pulley case indicated at 12 in FIG. 1 inserted in the open end of the rod 10. It will be understood, of course, that drawcords will be inserted into both ends of a curtain rod and that right-hand and left-hand pulley cases will be required. In the embodiment herein shown, I am only describing the pulley support elements for one end of the curtain rod because the elements for use at the other end of the rod are identical in construction except with the components reversed for the opposite position.

The pulley support elements are composed of a molded plastic, which is essentially tough, hard, horny, but yet slightly resilient material having a smooth surface adaptable for frictionless contact between similar plastic elements. In a preferred embodiment of my invention I have employed a thermoplastic polyamid superpolymer, otherwise called nylon. This material has a very acceptable relatively frictionless surface. However, it will be understood that other materials may be suitable including various forms of polyester resins, polystyrene, linear polyethylene, vinyl resins, hard rubber, phenolic resins, and the like. The support elements include a base 14 with a raised positioning plug 16 molded thereon. The plug 16 is dimensioned to conform to the inside of the curtain rod 10 to hold the same in fixed position relative to the pulley support elements.

A pulley support arm 18 extends inwardly from the base 14 along the inner face of one side wall of the rod 10. At its base the pulley support arm 18 is reinforced by a transversely extending web 20. In the context of a C-shaped curtain rod, the pulley support arm 18 is given a vertical dimension sufficient to overlap the opening in the side wall of the C-shaped rod, but in order to maintain the arm 18 in the correct position of longitudinal alignment, a small positioning plug 22 is located on the outer end of the arm 18 extending into the opening in the wall of the rod.

The pulley support arm 18 carries a pair of pulley support pintles 24 extending out horizontally from its inner surface and extending across the inside of the curtain rod 10 to a position closely adjacent to the opposite side wall thereof. It will be seen that the pulley support arm 18 is relatively thin, and accordingly it is subject to minor distortions after molding, as well as distortions due to the stress of supporting curtain drawcords under tension. Thus the positioning of the pintles 24 closely adjacent to the opposite side wall of the curtain rod permits them to serve as buttressing elements to maintain the pulley support arm 18 in the correct position.

The pulley support elements are locked in place in the rod 10 by means of a short locking arm 26 extending inwardly from the base 14 on the opposite side from the pulley support arm 18. The locking arm 26 is likewise integral with and supported by the web 20. It performs its locking function by means of a wedge-shaped latch element 28 mounted on its outer surface and snapping into a small opening provided for that purpose in the outer wall of the curtain rod 10. Since the locking arm 26 is quite short, it terminates before reaching a position of interference with the innermost pulley supported on the pulley arm 18. The rod 10 is also provided with an opening in its lower portion through which curtain drawcords 30, indicated in dotted lines in FIG. 2, may pass.

The pulley support pintles 24 serve to support molded pulleys 32 shown in enlarged cross section in FIG. 6, adjacent to an enlarged view of the pintle therefor shown in FIG. 7. In these two views it will be seen that the pintles 24 are provided with a flanged head 34 having an outer rim 36 thereon and being separated from the main body of the pintle 24 by a narrow annular recessed groove 38. Also in these figures it will be seen that the pulleys 32 are provided with a cylindrical inner bearing surface 40 of approximately the same diameter as the outside diameter of the flanged head 34 of the pintles 24, and on the inner edge thereof the pulleys 32 are provided with an inwardly extending annular lip 42. The dimensions of the lip 42 and rim 36 are selected in relation to the elastic limit of the material of which these elements are composed so that forcing the flanged head 34 on the pintle 24 through the pulley 32, or vice versa, will cause the lip 42 and rim 36 to recede permitting such passage without exceeding the elastic limit. Once the pulley 32 has been placed on the pintle 24, the lip 42 and rim 36 resume their former positions thereby locking the pulley 32 on the pintle 24. Also the lip 42 will then ride substantially in the groove 38 when the pulley 32 is in rotation. It will be understood that the lip 42 and rim 36 are beveled in order to facilitate easy insertion. Also it will be understood that the flanged head 34 serves the purpose of holding the pulley 32 back from actual contact with the opposite inside face of the curtain rod. For this same purpose on the side adjacent the pulley support arm 18, I provide a shallow raised hub 44 on the inside face of the pulley 32.

With the pulley support elements of my invention I achieve with an absolute minimum of parts an extremely efficient, noiseless, inexpensive and effective pulley support arrangement. Moreover with the elements as shown, the permissible range of tolerance of the pulley itself and the pintles may be sufficiently large to completely obviate any possible binding or other disadvantages that may arise from uneven expansion or contraction of the material employed due to the presence or absence of moisture affecting one part or another.

Since numerous minor variations of the preferred embodiment of my invention herein shown will now be apparent to those skilled in the art, it is not my intention to confine my invention to the precise form herein shown, but rather to limit it in terms of the appended claims.

Having thus described and disclosed a preferred embodiment of my invention, what I claim as new and desire to secure by Letters Patent of the United States is:

1. An integral molded plastic curtain drawcord pulley support assembly, two pulleys each having a raised hub, and a hollow curtain rod combination comprising: bottom, top, and side walls in an end of said rod defining an opening therein extending longitudinally into said rod; drawcord support assembly mounted in said opening comprising a base, a single pulley support arm mounted on said base and extending longitudinally along one side wall of said rod, an upper cord cantilever pintle mounted on said arm with a pulley being rotatably mounted on said upper cord pintle with said raised hub bearing against said support arm, a lower cord cantilever pintle mounted on said arm with a pulley being rotatably mounted on said lower cord pintle with said raised hub bearing against said support arm, said pintles being longitudinally spaced on said support arm and extending across said opening to a point adjacent the opposite side wall and with rounded heads projecting beyond said pulleys for bearing against said opposite side wall whenever there is misalignment in said opening to correct said misalignment and to hold the pulleys clear of the opposite side wall for free rotation; and means for anchoring said base in a fixed position in said opening.

2. A curtain drawcord pulley case and hollow curtain rod combination comprising: bottom, top and side walls in an end of said rod defining an opening therein extending longitudinally into said rod; drawcord support means made of molded nylon in said opening comprising an integrally molded base, a pulley support arm on said base extending longitudinally therefrom into said opening along one side wall of said rod, and longitudinally spaced cantilever pintles extending from said support arm; a pulley having a cylindrical inner bearing surface and a lip of smaller diameter at one end of said bearing surface rotatably mounted on each said pintle, a flanged head on said pintle having a rim thereon, the outer surface of said flanged head in position adjacent to the inner face of the other side wall of said rod and providing said pulley support arm with lateral support within the rod, a groove in said pintle inward of said flanged head, said lip riding in free rotating relation in said groove when said pulley is on said pintle; said bearing surface of said pulley having an inside diameter greater than the outside diameter of said pintle by a dimension at least as great as the largest dimensional difference possible due to uneven moisture absorption by said nylon between said pulley and said pintle; and said rim and lip overlapping each other by a dimension at least as great as the largest dimensional difference possible due to uneven moisture absorption into said nylon between said pulley and said flanged head but not so great as to result in permanent distortion of said nylon when said pulley is forced onto said pintle.

3. Apparatus according to claim 2 in which the flanged head of each of said pintles has a convex contoured end for spacing said other wall from the side surface of said pulleys when said lip is in said groove.

References Cited in the file of this patent

UNITED STATES PATENTS

| | | |
|---|---|---|
| 1,606,582 | Kirsch | Nov. 9, 1926 |
| 2,486,224 | Stutz | Oct. 25, 1949 |
| 2,619,166 | Graber | Nov. 25, 1952 |
| 2,724,867 | Smith | Nov. 29, 1955 |
| 2,913,284 | Zankl | Nov. 17, 1959 |